US012634488B2

(12) United States Patent
Azevedo et al.

(10) Patent No.: US 12,634,488 B2
(45) Date of Patent: May 19, 2026

(54) TUNABLE HYBRID NEURAL VIDEO REPRESENTATIONS

(71) Applicants: Disney Enterprises, Inc., Burbank, CA (US); ETH Zürich (EIDGENÖSSISCHE TECHNISCHE HOCHSCHULE ZÜRICH), Zurich (CH)

(72) Inventors: Roberto Gerson de Albuquerque Azevedo, Zurich (CH); Christopher Richard Schroers, Uster (CH); Scott Labrozzi, Cary, NC (US); Jens Eirik Saethre, Zürich (CH); Yuanyi Xue, Alameda, CA (US)

(73) Assignees: Disney Enterprises, Inc., Burbank, CA (US); ETH ZÜRICH (EIDGENÖSSISCHE TECHNISCHE HOCHSCHULE ZÜRICH), Zurich (CH)

( * ) Notice: Subject to any disclaimer, the term of this patent is extended or adjusted under 35 U.S.C. 154(b) by 0 days.

(21) Appl. No.: 18/920,734

(22) Filed: Oct. 18, 2024

(65) Prior Publication Data

US 2025/0168367 A1     May 22, 2025

Related U.S. Application Data

(60) Provisional application No. 63/599,972, filed on Nov. 16, 2023.

(51) Int. Cl.
*H04N 19/189* (2014.01)
*H04N 19/136* (2014.01)
(Continued)

(52) U.S. Cl.
CPC ......... *H04N 19/189* (2014.11); *H04N 19/136* (2014.11); *H04N 19/172* (2014.11); *H04N 19/177* (2014.11)

(58) Field of Classification Search
CPC .. H04N 19/189; H04N 19/136; H04N 19/172; H04N 19/177; H04N 19/42;
(Continued)

(56) References Cited

U.S. PATENT DOCUMENTS

2021/0133457 A1* 5/2021 Zhang ................. G06F 18/2134
2022/0385907 A1* 12/2022 Zhang ................. H04N 19/172
2024/0163479 A1 5/2024 Azevedo et al.

OTHER PUBLICATIONS

Joo Chan Lee, Daniel Rho, Jong Hwan Ko, Eunbyung Park "FFNeRV: Flow-Guided Frame-Wise Neural Representations for Videos" arxiv. org, Cornell University Library, Dec. 23, 2022 (hereinafter FFNeRV).*

(Continued)

*Primary Examiner* — Shahan UR Rahaman
(74) *Attorney, Agent, or Firm* — Farjami & Farjami LLP

(57) ABSTRACT

A system includes a tunable neural network-based video encoder configured to receive a video sequence including multiple video frames, generate a frame-specific embedding of a first video frame of the multiple video frames, and identify one or more group-of-pictures (GOP) features of a subset of the multiple video frames, the subset of the including the first video frame. The tunable neural network-based video encoder is further configured to combine the frame-specific embedding of the first video frame and the one or more GOP features of the first plurality of the plurality of video frames to provide a latent feature corresponding to a compressed version of the first video frame.

15 Claims, 4 Drawing Sheets

(51) Int. Cl.
    *H04N 19/172*     (2014.01)
    *H04N 19/177*     (2014.01)

(58) Field of Classification Search
    CPC ...... H04N 19/587; H04N 19/59; H04N 19/60;
             G06N 3/045; G06N 3/0464; G06N 3/084;
             G06N 3/088; G06V 10/82; G06V 20/46;
                             G06T 9/002; G06T 9/007
    See application file for complete search history.

(56)               References Cited

OTHER PUBLICATIONS

Carlos Gomes, Roberto Azevedo, Christopher Schroers "Video Compression with Entropy-Constrained Neural Representations" 2023 IEEE/CVF Conference on Computer Vision and Pattern Recognition (CVPR), IEEE, Jun. 17, 2023 (Hereinafter Gomes).*

Hao Chen, Matthew Gwilliam, Ser-Nam Lim, Abhinav Shrivastava "HNeRV: A Hybrid Neural Representation for Videos" arxiv.org, Cornell University Library, Apr. 5, 2023.*

Deniz Oktay, Johannes Balle, Saurabh Singh, Abhinav Shrivastava "Scalable Model Compression by Entropy Penalized Reparameterization" Published as a conference paper at ICLR 2020 11 Pgs.

Hao Chen, Bo He, Hanyu Wang, Yixuan Ren, Ser-Nam Lim, Abhinav Shrivastava "NeRV: Neural Representations for Videos" 35th Conference on Neural Information Processing Systems (NeurIPS 2021) Sydney Australia 15 Pgs.

Zhuang Liu, Hanzi Mao, Chao-Yuan Wu, Christoph Feichtenhofer, Trevor Darrell, Saining Xie "A ConvNet for the 2020s" 2022 IEEE/CVF Conference on Computer Vision and Pattern Recognition (CVPR), New Orleans, LA, USA, 2022 15 Pgs.

Zizhang Li, Mengmeng Wang, Huaijin Pi, Kechun Xu, Jianbiao Mei, Yong Liu "E-NeRV: Expedite Neural Video Representation with Disentangled Spatial-Temporal Context" ECCV 2022, 17th European Conference, Tel Aviv, Israel, Oct. 23-27, 2022 27 Pgs.

Joo Chan Lee, Daniel Rho, Jong Hwan Ko, Eunbyung Park "FFNeRV: Flow-Guided Frame-Wise Neural Representations for Videos" MM '23: Proceedings of the 31st ACM International Conference on Multimedia Oct. 27, 2023 15 pgs.

Hao Chen, Matthew Gwilliam, Ser-Nam Lim, Abhinav Shrivastava "HNeRV: A Hybrid Neural Representation for Videos" 2023 IEEE/CVF Conference on Computer Vision and Pattern Recognition (CVPR) Jun. 2023 15 Pgs.

Qi Zhao, M. Salman Asif, Zhan Ma "DNeRV: Modeling Inherent Dynamics via Difference Neural Representation for Videos" 2023 IEEE/CVF Conference on Computer Vision and Pattern Recognition Jun. 2023 22 Pgs.

Carlos Gomes, Roberto Azevedo, Christopher Schroers "Video Compression with Entropy-Constrained Neural Representations" Proceedings of the IEEE/CVF Conference on Computer Vision and Pattern Recognition (CVPR), 2023 10 Pgs.

Extended European Search Report dated May 20, 2025 for EP Application 202411659.8.

Carlos Gomes, Roberto Azevedo, Christopher Schroers "Video Compression with Entropy-Constrained Neural Representations" 2023 IEEE/CVF Conference on Computer Vision and Pattern Recognition (CVPR), IEEE, Jun. 17, 2023 10 Pages.

Jens Eirik Saethre, Roberto Azevedo, Christopher Schroers "Combining Frame and GOP Embeddings for Neural Video Representation" 2024 IEEE/CVF Conference on Computer Vision and Pattern Recognition (CVPR), IEEE, Jun. 16, 2024 11 Pages.

Joo Chan Lee, Daniel Rho, Jong Hwan Ko, Eunbyung Park "FFNeRV: Flow-Guided Frame-Wise Neural Representations for Videos" arxiv. org, Cornell University Library, Dec. 23, 2022 15 Pages.

Hao Chen, Matthew Gwilliam, Ser-Nam Lim, Abhinav Shrivastava "HNeRV: A Hybrid Neural Representation for Videos" arxiv.org, Cornell University Library, Apr. 5, 2023 15 Pages.

* cited by examiner (b) T-NeRV Blocks 3 - 5.

(a) T-NeRV Blocks 1 and 2.

Fig. 3

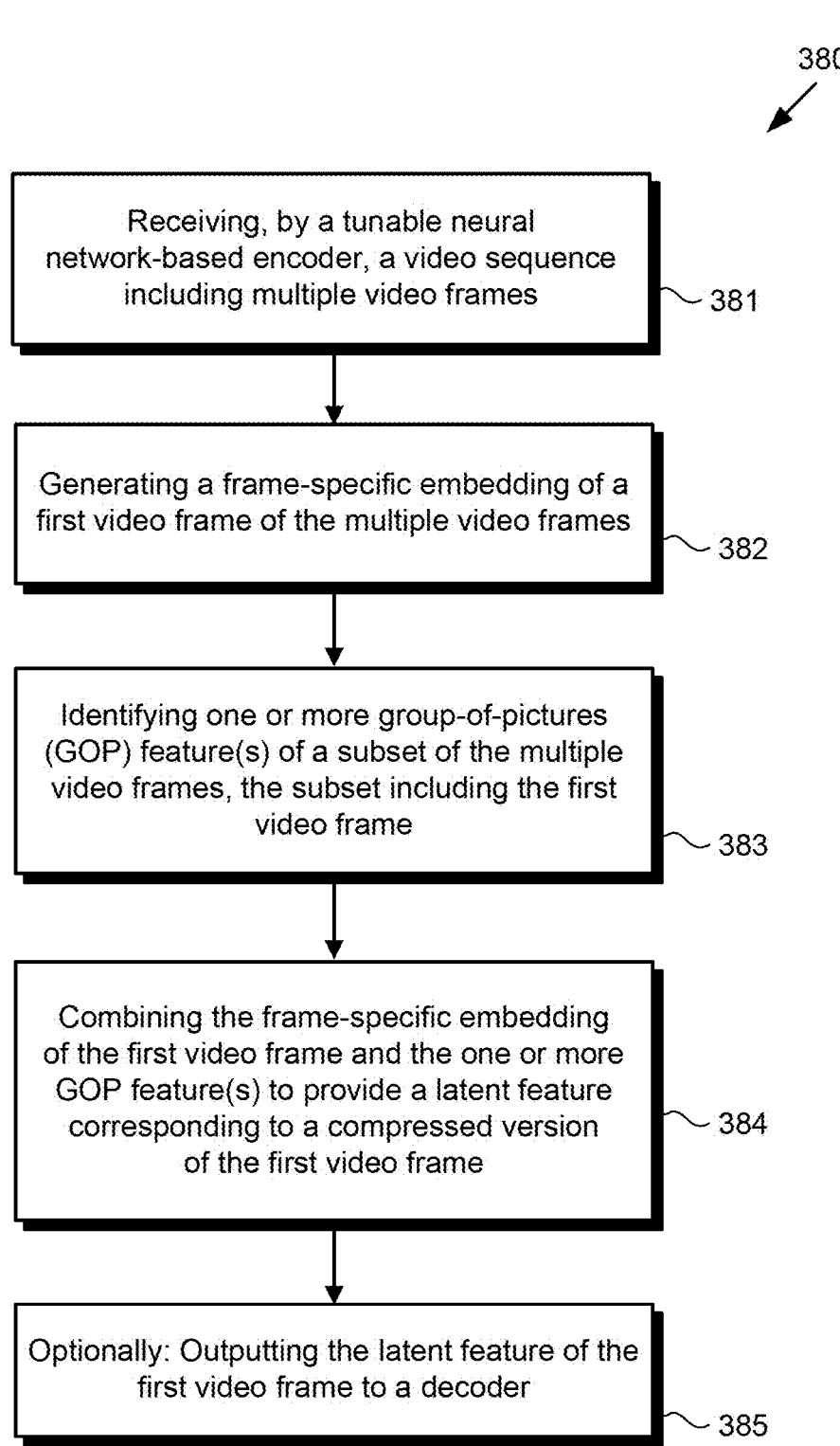

380

Receiving, by a tunable neural network-based encoder, a video sequence including multiple video frames

381

Generating a frame-specific embedding of a first video frame of the multiple video frames

382

Identifying one or more group-of-pictures (GOP) feature(s) of a subset of the multiple video frames, the subset including the first video frame

383

Combining the frame-specific embedding of the first video frame and the one or more GOP feature(s) to provide a latent feature corresponding to a compressed version of the first video frame

384

Optionally: Outputting the latent feature of the first video frame to a decoder

385

TUNABLE HYBRID NEURAL VIDEO REPRESENTATIONS

RELATED APPLICATIONS

The present application claims the benefit of and priority to U.S. Provisional Patent Application Ser. No. 63/599,972 filed on Nov. 16, 2023, and titled "Tunable Hybrid Neural Video Representations," which is hereby incorporated fully by reference into the present application.

BACKGROUND

Video compression is a long-standing and difficult problem that has inspired much research. The main goal of video compression is to represent a digital video (typically a sequence of frames, each being represented by a two-dimensional (2-D) array of pixels, RGB or YUV colors) using the minimum amount of storage while concurrently minimizing loss of quality. Although many advances to traditional video codecs have been made in recent decades, the advent of deep learning has inspired many new approaches that surpass traditional video codecs.

Implicit neural representations (INRs), for example, have attracted significant research interest and have been applied to various domains, including video compression. In addition to exhibiting desirable properties such as fast decoding and the ability of temporal interpolation, INR-based approaches can match or surpass traditional standard video codecs such as Advanced Video Encoding (AVC, also referred to as H.264) and High Efficiency Video Encoding (HEVC) in compression performance. However, these existing approaches to utilizing INRs for video compression only perform well in limited and sometimes highly constrained settings, such as being limited to specific model sizes, fixed aspect ratios, and relatively static video sequences, for instance.

By way of background, early video INRs employed pixel-wise representations that mapped pixel indices to RGB colors but suffered from limited performance and poor decoding speeds. However, a frame-wise representation with Neural Representations for Videos (NeRV) has also been proposed. In NeRV, a Multi-Layer Perceptron (MLP) generates a temporal feature from a positionally-encoded frame index that is reshaped and upsampled. NeRV enables real-time decoding speed and significantly better reconstructions than previous video INRs. Inspired by works on generative adversarial networks (GANs), Expedite NeRV (E-NeRV) was developed, in which the featurizer used in traditional NeRV is decomposed into temporal and spatial contexts that are fused by a transformer network, and further injects temporal information into the decoder blocks via an adaptive instance normalization (AdaIN) layer.

Flow-Guided Frame-Wise NeRV (FFNeRV) improves performance on dynamic sequences by enforcing temporal consistency with a decoder that predicts both independent frames and a set of optical flow maps that are used to warp adjacent independent frames and combine them to provide a final output frame. A hybrid representation, HNeRV, resembles an autoencoder during training, employing an encoder to extract content-specific embeddings. After training concludes, the video is represented by the parameters of the decoder and the per-frame embeddings. Although the existing variations on NeRV identified above, i.e., E-NeRV, FFNeRV and HNeRV, represent improvements over original NeRV, their usefulness is often confined to specific settings, for example succeeding with static sequences while faltering on high-motion content, or vice versa. Conventional hybrid approaches show promise in the low bitrate regime but fail to scale to higher bitrates and are currently limited to video with an unusual 2:1 aspect ratio. Thus, there is a need in the art for a neural network-based video compression solution capable of encoding video frames efficiently across a range of use cases and parameters.

BRIEF DESCRIPTION OF THE DRAWINGS

FIG. 3 is a flowchart outlining a method for performing tunable hybrid neural video representation, according to one implementation.

DETAILED DESCRIPTION

Figure 1A:
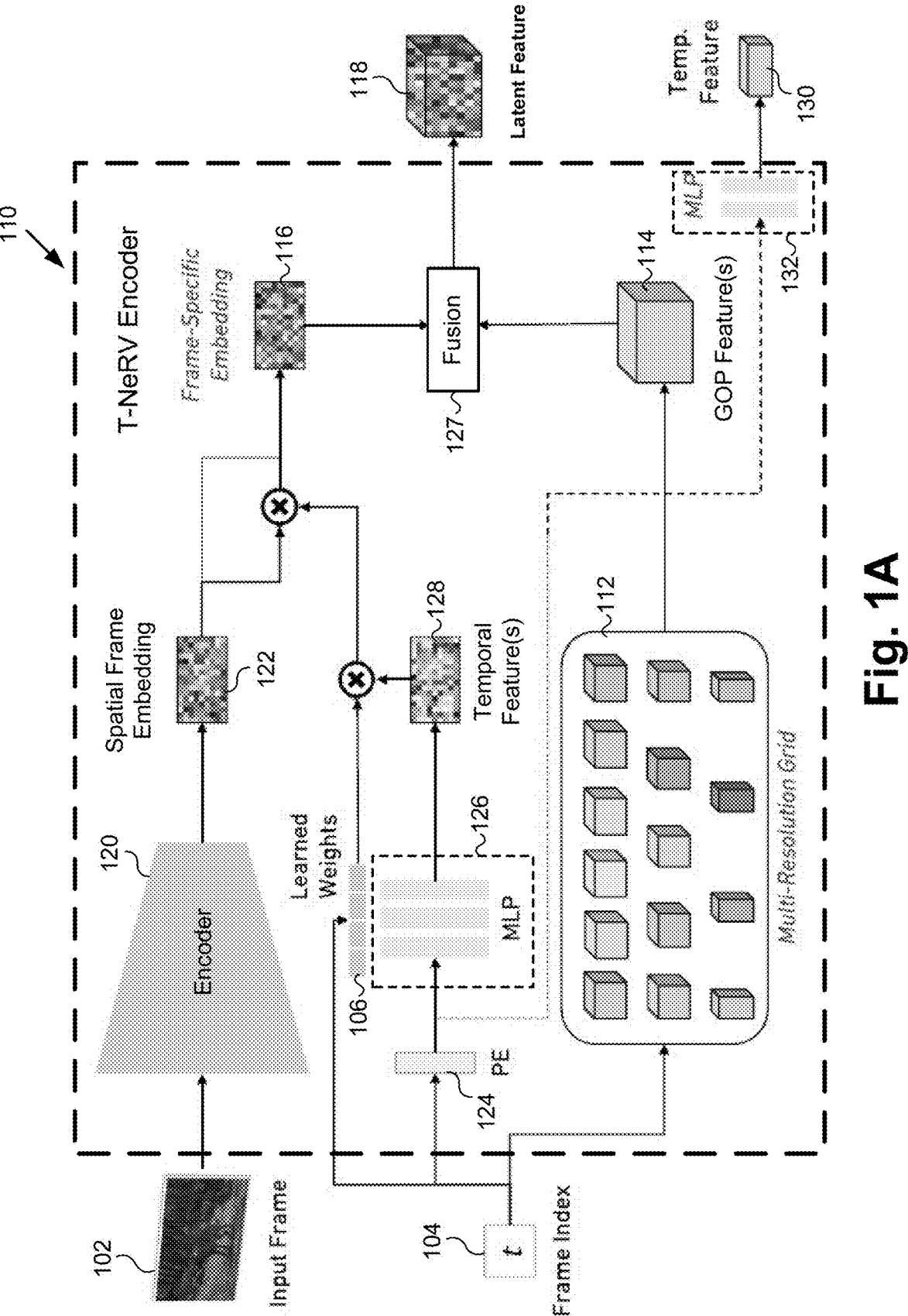
FIG. 1A shows a diagram depicting an exemplary architecture for a tunable hybrid implicit neural representations for video (T-NeRV) encoder of a video compression system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application addresses and overcomes the deficiencies in the conventional art by using a tunable hybrid implicit neural representation (INR) for video (hereinafter "T-NeRV") solution that improves over existing techniques and advances the state-of-the-art based on the insight that traditional codecs, such as Advanced Video Encoding (AVC, also referred to as H.264) and High Efficiency Encoding (HEVC) for example, require both local and non-local information to encode frames efficiently. Moreover, the tunable hybrid neural video representation solution disclosed herein may advantageously be implemented as automated or substantially automated systems and methods.

As used in the present application, the terms "automation," "automated" and "automating" refer to systems and processes that do not require the participation of a human user, such as a human system operator or administrator. Although in some implementations the performance of the systems and methods disclosed herein may be monitored by a human system operator, that human involvement is optional. Thus, the methods described in the present application may be performed under the control of hardware processing components of the disclosed systems.

The novel and inventive T-NeRV solution disclosed in the present application implements a video compression system including a tunable neural network-based video encoder that combines frame-specific embeddings with group of pictures specific (GOP-specific) features and upsamples them with a decoder based on optical flow. This novel and inventive combination of frame-specific and GOP-specific features provides a lever for content-specific fine-tuning. For example, larger frame embeddings, i.e., emphasizing frame-specific features, can extract more high-frequency information, improving performance on low-motion sequences. Conversely, more prominent GOP-specific features allow the T-NeRV model to extract more temporal context that the decoder can make use of to reconstruct frames in dynamic sequences. For compression, the T-NeRV solution disclosed in the present application jointly minimizes rate and distortion via quantization-aware and entropy-constrained training to capture embeddings as well. By employing a single entropy model for all embeddings, the present T-NeRV solution can make use of their redundancies to a higher degree than previous approaches. End-to-end training also enforces the present T-NeRV network to fine-tune itself to the target video content by spending more bits on the frame-specific embeddings or the GOP-specific features, automatically adjusting the tuning lever.

The present T-NeRV solution contributes at least the following features to the present state-of-the-art: (i) a tunable hybrid video INR that combines frame-specific embeddings with GOP-specific features, thereby providing a lever for content-specific fine-tuning and (ii) extension of the information-theoretic INR compression framework to include embeddings, thereby making use of the significant redundancies within them. It is noted that the tuning of the model, as well as the balance of the combination of frame-specific embeddings with GOP-specific features is performed automatically during training and optimization of the T-NeRV model, although a system user can assert some control by defining the maximum size of the feature maps used. It is further noted that, when evaluated on the UVG dataset, the T-NeRV solution disclosed by the present application outperforms all previous video INRs on both video representation and video compression tasks.

Figure 1B:
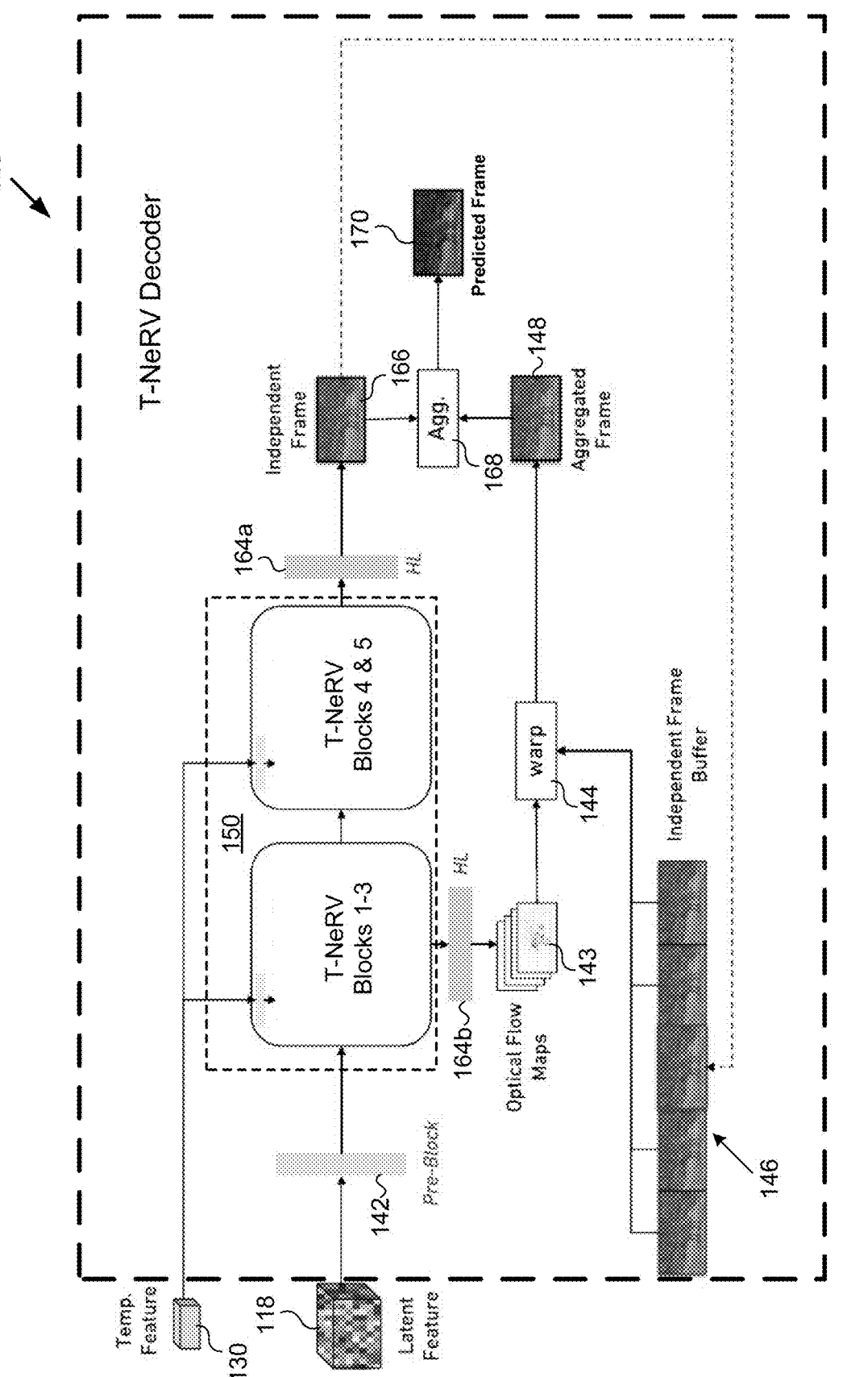
FIG. 1B shows a diagram depicting an exemplary architecture for an optical flow-based T-NeRV decoder suitable for use with the exemplary T-NeRV encoder shown in FIG. 1A, according to one implementation.

FIG. 1A shows a diagram depicting an exemplary architecture for T-NeRV encoder 110 of a video compression system, according to one implementation of the present concepts, while FIG. 1B shows a diagram depicting an exemplary architecture for optical flow-based T-NeRV decoder 140 suitable for use with exemplary T-NeRV encoder 110, according to one implementation. T-NeRV encoder 110 is configured to generate latent feature 118, i.e., $z_t \in \mathbb{R}^{c_l \times h \times w}$ from a ground truth frame 102, i.e., $F_t \in \mathbb{R}^{3 \times H \times W}$ (hereinafter "input video frame 102") and a normalized frame index 104, t, from which T-NeRV decoder 140 reconstructs predicted frame 170, i.e., $\hat{F}_t$, shown in FIG. 1B. It is noted that the aspect ratio of latent feature 118 matches that of input video frame 102, i.e.

$$\frac{h}{w} = \frac{H}{W}.$$

As shown in FIG. 1A, T-NeRV encoder 110 includes large encoder 120, positional encoder (PE) 124, Multi-Layer Perceptron (MLP) 126, multi-resolution feature grid 112, fusion block 127, and in some implementations may also include MLP 132. Also shown in FIG. 1A are learned weights 106, spatial frame embedding 122, one or more temporal features 128 (hereinafter "temporal feature(s) 128"), one or more GOP-specific features 114 (hereinafter "GOP feature(s) 114"), frame-specific embedding 116 and optional temporal feature output 130.

During training, the T-NeRV network including T-NeRV encoder 110 and T-NeRV decoder 140 performs forward passes and backward passes, as known in the art, to optimize the network parameters. Once training concludes, only GOP feature(s) 114, frame specific embedding 116, i.e., a feature map or tensor representation of a video frame, latent feature 118 and optionally temporal feature output 130 are retained as part of the video state, while the remainder of the features shown in FIG. 1A are discarded. Decoding input video frame 102 thus amounts to obtaining GOP feature(s) 114 from multi-resolution feature grid 112, and fusing them with frame-specific embeddings 116, using any suitable combination technique, such as concatenation or fusion for example, to obtain latent feature 118 ($z_t$) of input video frame, which is passed through T-NeRV decoder 140.

Frame-specific embedding 116, $e_t \in \mathbb{R}^{c_E \times h \times w}$ can serve as one of two components of latent feature 118. Frame-specific embedding 116 can be generated in two steps: First, large encoder 120 may extract spatial frame embedding 122, $e_t$, from input video frame 102, which may then be augmented with additional temporal feature(s) 128. This augmentation is a mathematical operation that combines spatial frame embedding 122 with temporal feature(s) 128 by concatenating them or, alternatively, combining them using any other mathematical technique, a neural network, or transformers, for example. Because the frame-specific embeddings themselves are transmitted to the decoder, all network blocks involved in generating them can be discarded after encoding. As a result, large encoder 120 may be approximately one hundred times larger, i.e., include one hundred times more weights, than conventional encoders used in HNeRV networks because the encoder weights themselves will not be transmitted to the decoder.

The spatial frame embedding 122 may be further augmented with temporal feature(s) 128. For example, positional encoder (PE) 124 followed by multilayer perceptron (MLP) 126 may be utilized to provide temporal information, which may then be reshaped into temporal feature(s) 128 ($s_t \in \mathbb{R}^{c_E \times h \times w}$) matching the dimension of spatial frame embedding, 122 $\hat{e}_t$. Temporal feature(s) 128 may then be combined with spatial frame embedding 122 $\hat{e}_t$, as described above, to obtain frame-specific embedding 116, which may be expressed as:

$$e_t = \hat{e}_t \cdot (1 + \alpha_t \cdot s_t) \qquad \text{(Equation 1)}$$

where $\alpha_t$ represents learned weights 106 specific to each frame that modulates the extent to which temporal feature(s) 128, $s_t$, is/are included in frame-specific embedding 116. This lets the T-NeRV network decide on a per-frame basis whether and to what extent to incorporate temporal feature(s) 128 into frame-specific embedding 116. It is noted that the mechanism for combining spatial frame embedding 122 and temporal feature(s) 128 to provide frame-specific embedding 116 can be regarded as a per-frame masking operation on frame-specific embedding 116, allowing similar frames to obtain different embeddings. T-NeRV decoder 140 can make use of that information to decide which portions of the frame to reconstruct from the frame's own independent frame and for which portions to rely on inter-frame information.

T-NeRV encoder 110 utilizes multi-resolution feature grid 112 to obtain GOP feature(s) 114, $g_t \in \mathbb{R}^{c_G \times h \times w}$ During a forward pass, frame index 104, t, is used to index into the grids, selecting two features in the form of learned numbers or tensors that t lies within at every level of multi-resolution feature grid 112. A bilinear interpolation may be performed between these two features and the results from every level may be concatenated, fused or otherwise combined to obtain GOP feature(s) 114. It is noted that, in contrast to FFNeRV, T-NeRV allows features at different levels of multi-resolution feature grid 112 to vary in size with respect to the number of channels $c_i$ while maintaining their spatial dimensions (h, w). This modification allows T-NeRV to advantageously regulate the amount of information that is captured for different GOP sizes. It is noted that this regulation by T-NeRV is occurs automatically during the optimization performed during the learning process.

Latent feature 118 obtained from fusing GOP feature(s) 114 and frame-specific embedding 116 may be passed to T-NeRV decoder 140 along with temporal feature output 130, $u_t \in \mathbb{R}^{128}$, generated by MLP 132. According to the exemplary implementation shown in FIG. 1B, T-NeRV decoder 140 may include three parts: Pre-block convolutional layer 142, series of T-NeRV blocks 150 (e.g., five T-NeRV blocks), and flow-based warping block 144. It is noted that pre-block convolutional layer 142 includes a convolutional layer with a kernel that performs either channel expansion or channel reduction, i.e., tensor reshape operations known in the art, depending on the size of latent feature 118 and the dimension expected by the first of T-NeRV block 150. Also shown in FIG. 1B are head layers, i.e., output layers, 164a and 164b, optical flow maps 143, independent frame buffer 146, aggregated frame 148, independent frame 166, aggregation block 168 and predicted frame 170 corresponding to input video frame 102 in FIG. 1A.

Figure 2:
FIG. 2 schematically depicts a series of T-NeRV blocks suitable for use in the T-NeRV decoder shown in FIG. 1B, according to one implementation.
Figure 2:
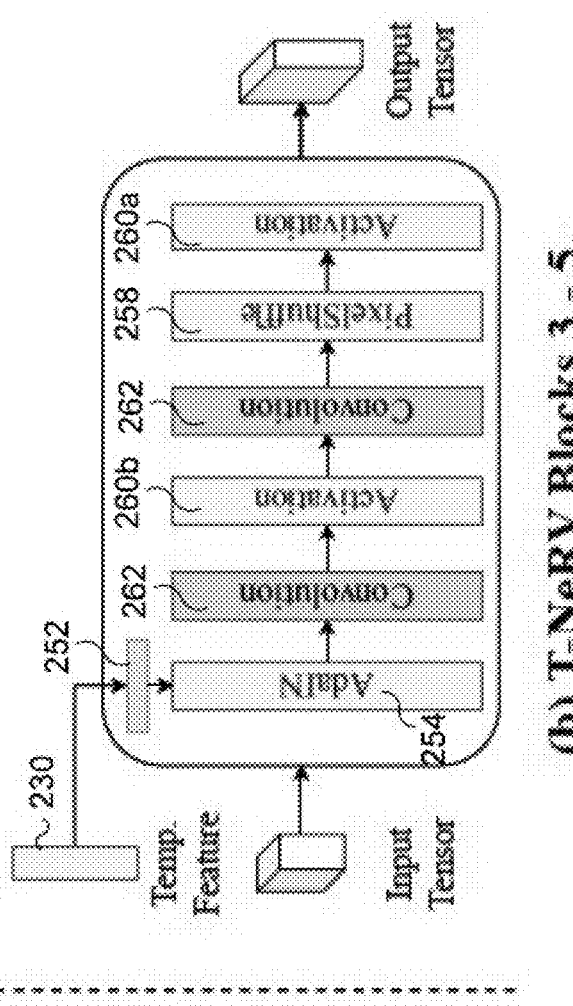
Figure 2:
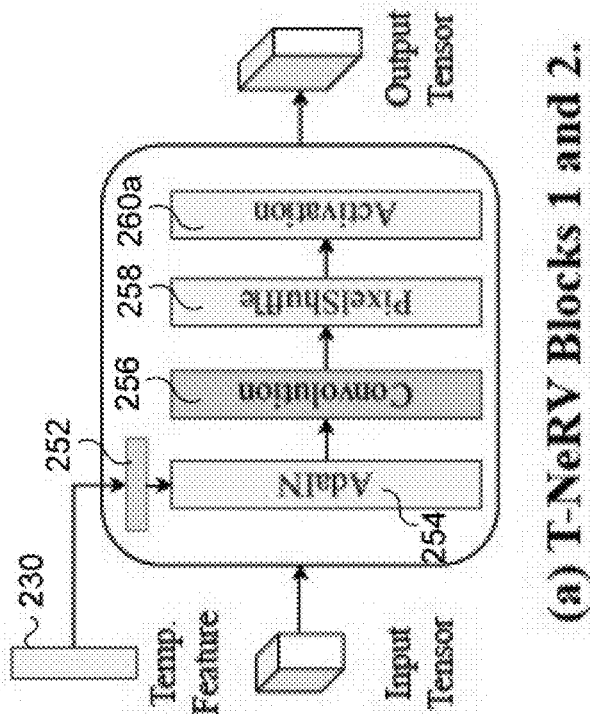

T-NeRV decoder 140 may utilize series of T-NeRV blocks 150 to predict independent frame 166 and optical flow maps 143. Referring to FIG. 2, FIG. 2 schematically depicts series of T-NeRV blocks 250 suitable for use in T-NeRV decoder 140 in FIG. 1B, according to one implementation. As shown in FIG. 2, linear layer 252 extracts per-channel statistics, such as, for example, mean and variance, from temporal feature output 230 from T-NeRV encoder 110 that are used to shift the distribution of the input tensor via adaptive instance normalization (AdaIN) layer 254, thereby injecting temporal information into series of T-NeRV blocks. It is noted that temporal feature output 230 and a series of T-NeRV blocks 250 correspond respectively in general to temporal feature output 130 and series of T-NeRV blocks 150, shown variously in FIGS. 1A and 1B. Consequently, temporal feature output 130 and series of T-NeRV blocks 150 may share any of the characteristics attributed to respective temporal feature output 230 and series of T-NeRV blocks 250 by the present disclosure, and vice versa.

As further shown in FIG. 2, in addition to linear layer 252 and AdaIN layer 254, the first two T-NeRV blocks of series of T-NeRV blocks 150/250 include convolutional layer 256 (e.g., a 5×5 convolutional layer) with channel expansion and a subsequent PixelShuffle layer 258, which can perform spatial upsampling, and which may be followed by activation function 260a in the form of a Gaussian Error Linear Unit (GELU) activation function. In some implementations, T-NeRV decoder 140 may utilize a low channel decrease factor, e.g., r=1.2, and increasing kernel sizes. This approach allows T-NeRV decoder 140 to allocate more parameters to the later stages, aiding the reconstruction of high frequency details. In particular, this strategy renders the third T-NeRV block of series of T-NeRV blocks 150/250 the largest, which is advantageous given its dual use in upsampling and optical flow prediction.

It is noted that although HNeRV teaches kernel sizes $k_i = \min\{2i-1, 5\}$, 5×5 convolutions are found to be both computationally expensive and parameter-inefficient. In further contrast to HNeRV, T-NeRV blocks three through five of series of T-NeRV blocks 150/250 employ two successive convolutional layers 262 (e.g., 3×3 convolutional layers) with the same total number of parameters and an additional activation 260b in between convolutional layers 262, resulting in the block architecture shown in panel (b) of FIG. 2. The higher parameter efficiency and the additional non-linearity further help T-NeRV decoder 140 to reconstruct high-frequency information.

Flow-based warping block 144, in FIG. 1B, serves as a flow-guided aggregation module for re-use of information from adjacent frames via optical flow. To that end, head layer 164a, i.e., one or more output layers after the fifth T-NeRV block of series of T-NeRV blocks 150/250, outputs an independent frame 166, $I_t \in \mathbb{R}^{3 \times H \times W}$ and two aggregation weights $w_t$, $w_A \in \mathbb{R}^{H \times W}$. A copy independent frame 166, $I_t$, is detached from the computation graph and stored in independent frame buffer 146. An aggregation window $\mathcal{W}$, e.g., $\mathcal{W} = \{-2, -1, 1, 2\}$ may then be defined to make use of information from the previous and following two frames. During the forward pass of frame index 104, t, in FIG. 1A, head layer 164b after the third T-NeRV block of series of T-NeRV blocks 150/250 predicts optical flow maps 143, $M(t, t+j) \in \mathbb{R}^{2 \times H/4 \times W/4}$, and weight maps, $w_M(t, t+j) \in \mathbb{R}^{H/4 \times W/4}$, for every j in the aggregation window $\mathcal{W}$. The optical flow maps and weight maps may then be bilinearly upsampled and normalized via a softmax function. The optical flow maps $M(t, t+j)$ may then be used by flow-based warping block 144 to warp the corresponding adjacent independent frames $I_{t+j}$, and the results may be aggregated in a weighted manner to obtain aggregated frame 148 $A_t$ as:

$$A_t = \sum_{j \in \mathcal{W}} w_M(t, t+j) \cdot WARP(I_{t+j}, M(t, t+j)) \qquad \text{(Equation 2)}$$

Finally, predicted frame 170 is obtained by combining aggregated frame 148, $A_t$, and independent frame 166, $I_t$, in another weighted aggregation at aggregation block 168, i.e., predicted frame 170 $\hat{F}_t = w_I \cdot I_t + w_A \cdot A_t$.

With respect to training of the T-NeRV network including T-NeRV encoder 110 and T-NeRV decoder 140, it is noted that INR compression may be modeled as a rate-distortion problem $L = D + \lambda R$, where D denotes some distortion loss, R represents the entropy of the INR parameters $\theta$, and $\lambda$ establishes a trade-off between the two. Training an INR on loss L jointly has the desirable result of minimizing rate and distortion during training, allowing them to achieve compression by entropy-encoding the parameters $\theta$ after training concludes. Thus, the T-NeRV network including T-NeRV encoder 110 and T-NeRV decoder 140 may be trained using an optimized loss function including a distortion loss and an entropy loss, where the distortion loss and the entropy loss may be optimized jointly.

Moreover, because the training process described above requires a discrete set of symbols, such as the set of integers $\mathbb{Z}$ for example, quantization aware training is performed, using the straight-through estimator (STE), as known in the art, to ensure differentiability. Each layer is quantized independently using scale reparameterization with two trainable parameters. The entropy of each layer may then be estimated independently by fitting a small neural network to the weight distribution.

The same framework is then extended to handle parametric encodings, such as multi-resolution feature grid 112 of T-NeRV encoder 110, as well embeddings. Each of the multiple feature grids included among multi-resolution feature grid 112, such as three feature grids for example, is treated as its own layer with its own quantization parameters. During a forward pass, each feature grid is quantized and dequantized using the same scale reparameterization scheme before bilinearly interpolating two of its features. It is noted that adopting one entropy model per feature grid allows the T-NeRV network to determine the extent to which the features at each temporal frequency should be compressed.

By contrast to the approach described above by reference to multi-resolution feature grid 112, a single entropy model is adopted for all frame-specific embeddings 116, thereby encouraging the T-NeRV network to make use of redundancies between frames. This counterbalances the injection of temporal feature(s) 128 into frame-specific embeddings 116 discussed above, restricting the T-NeRV network to use such temporal information only when the gain in video quality outweighs the increase in entropy. Like the distortion loss, the entropy loss is back propagated through the T-NeRV network, which encourages the T-NeRV network to learn features in its feature grids that exhibit low entropy.

The functionality of T-NeRV encoder 110, shown in FIG. 1A, will be further described by reference to FIG. 3. FIG. 3 shows flowchart 380 outlining an exemplary method for performing tunable hybrid neural video representation, according to one implementation. With respect to the method outlined in FIG. 3, it is noted that certain details and features have been left out of flowchart 380 in order not to obscure the discussion of the inventive features in the present application.

Referring to FIG. 3 in combination with FIG. 1A, the method outlined by flowchart 380 includes receiving, by T-NeRV encoder 110, a video sequence including multiple video frames such as input video frame 102 (action 381). As shown in FIG. 1A, input video frame 102, as well as the other video frames included in the video sequence received in action 381, may be received by T-NeRV encoder 110 using large encoder 120 of T-NeRV encoder 110. As noted above, large encoder 120 may be approximately one hundred times larger, i.e., include one hundred times more weights, than conventional encoders used in HNeRV networks.

Continuing to refer to FIGS. 3 and 1A in combination, the method outlined by flowchart 380 further includes generating frame-specific embedding 116 of a first video frame (hereinafter "input video frame 102") of the video frames included in the video sequence received in action 381 (action 382). As noted above, frame-specific embedding 116 can be generated in one or two steps: First, large encoder 120 extracts spatial frame embedding 122 from input video frame 102, which may then, in some use cases, serve as frame-specific embedding 116, or, in other use cases, may be augmented with additional temporal feature(s) 128.

In implementations in which spatial frame embedding 122, $\hat{e}_t$, output by large encoder 120 is further augmented with temporal feature(s) 128 to provide frame-specific embedding 116, PE 124 followed by MLP 126 may be utilized to extract temporal information from frame index 104. That temporal information may be extracted from a subset of the video frames included in the video sequence received in action 381, where that subset of video frames of the video sequence includes input video frame 102. The temporal information output by MLP 126 may then be reshaped into temporal feature(s) 128, $s_t \in \mathbb{R}^{c_E \times h \times w}$, matching the dimension of spatial frame embedding 122. Temporal feature(s) 128 may then be fused into spatial frame embedding 122 to obtain frame-specific embedding 116. Thus, frame-specific embedding 116 may be generated, in action 382, by T-NeRV encoder 110 using large encoder 120 to provide spatial frame embedding 122, and in some use cases, combining spatial frame embedding 122 with temporal feature(s) 128.

Continuing to refer to FIGS. 3 and 1A in combination, the method outlined by flowchart 380 further includes identifying one or more GOP features of a subset of the video frames included in the video sequence received in action 381, where the subset of video frames includes input video frame 102 (action 383). Such GOP features may include I-frames (intra-coded pictures), P-frames (predicted pictures) and B-frames (bidirected pictures), for example, as well as the integers M and N, where M designates the number of frames between two anchor frames, i.e., the distance between an I-frame and a P-frame or the distance between two P-frames, and N designates the number of frames between two I-frames. It is noted that the subset of video frames from which one or more GOP features are identified in action 383 may be the same subset of video frames from which temporal feature(s) 128 are optionally extracted as part of action 382, or another subset of video frames of the video sequence received in action 381 that also includes input video frame 102.

Action 383 may be performed by T-NeRV encoder 110, using multi-resolution feature grid 112 to obtain one or more GOP feature(s). As noted above, during a forward pass, frame index 104, t, is used to index into the grids, selecting two features that frame index 104 lies within at every level of multi-resolution feature grid 112. A bilinear interpolation may be performed between these two features and the results from every level may be concatenated, fused or otherwise combined to obtain GOP feature(s) 114. As further noted above, in contrast to FFNeRV, T-NeRV allows features at different levels of multi-resolution feature grid 112 to vary in size with respect to the number of channels $c_i$ while maintaining their spatial dimensions (h, w). This modification allows T-NeRV to advantageously regulate the amount of information that is captured for different GOP sizes.

Continuing to refer to FIGS. 3 and 1A in combination, the method outlined by flowchart 380 further includes combining frame-specific embedding 116 of input video frame 102 and GOP feature(s) 114 identified in action 383, by concatenating them or, alternatively, combining them using any other mathematical technique, a neural network, or transformers, for example, to provide latent feature 118 corresponding to a compressed version of input video frame 102 (action 384). As noted above, T-NeRV encoder 110 is a tunable neural network-based video encoder configured to combine a frame-specific embedding 116 with group of GOP feature(s) using fusion block 127 to concatenate them or, alternatively, to combine them using any other mathematical technique, a neural network, or transformers, for example. That combination of frame-specific embedding 116 with GOP feature(s) 114 provides a lever for content-specific fine-tuning because emphasizing frame-specific embeddings 116 extracts more high-frequency information from video frames, thereby improving performance on low-motion sequences. Conversely, giving more prominence to GOP feature(s) 114 allows the T-NeRV model to extract more temporal context that decoder 140 can utilize to better reconstruct frames in dynamic sequences. As noted above, this lever action, or balancing of the combination of frame-specific embeddings with GOP-specific features is performed automatically during training and optimization of the T-NeRV model, although a system user can assert some control by defining the maximum size of the feature maps used.

Thus, latent feature 118 may be provided as a weighted or unweighted combination of frame-specific embedding 116 and GOP feature(s) 114 by T-NeRV encoder 110, in action 384. Moreover, in some implementations in which latent feature 118 is provided as a weighted combination of frame-specific embedding 116 and GOP feature(s) 114, one or both of a first weight applied to frame-specific embedding 116 or a second weight applied to GOP feature(s) in that weighted combination may be determined by T-NeRV encoder 110, based for example, on whether the content depicted in the video sequence received in action 381 is primarily static or primarily dynamic.

Referring to FIGS. 1A, 1B and 3 in combination, in some implementations, the method outlined by flowchart 380 may further include outputting latent feature 118 of input video frame 102 to a decoder, such as T-NeRV decoder 140, or, in other implementations, even another type of conventional NeRV-based decoder (action 385). It is noted that action 385 is optional, and in some implementations the method outlined by flowchart 380 may conclude with action 384 described above. Optional action 385, when performed, is performed by T-NeRV encoder 110, and, as discussed above, may also include providing temporal feature output 130 to the decoder.

It is noted that although actions 382, 383 and 384, or actions 382, 383, 384 and 385 are described above as being performed on a single video frame at a time, e.g., input video frame 102, in some implementations those actions can be performed on a segment (hereinafter "sub-sequence") of a video sequence. That is to say, in some use cases, input video frame 102 may correspond to a sub-sequence of the subset of video frames identified in action 383, frame-specific embedding 116 may include multiple frame-specific embeddings corresponding respectively to each video frame of the sub-sequence of the identified subset of video frames, and latent feature 118 may be multiple latent features each corresponding respectively to a compressed version of the video frames of the sub-sequence of the identified subset of video frames. In implementations in which latent feature 118 corresponds to multiple latent features, those multiple latent features may be output to the decoder, in action 385, or may be stored for later decoding.

In some implementations, the method outlined by flowchart 380 may conclude with action 385 described above. However, in implementations in which the video compression system including T-NeRV encoder 110 further includes T-NeRV decoder 140, the method outlined by flowchart 380 may further include the actions of receiving, by T-NeRV decoder 140, latent feature 118 from T-NeRV encoder 110, and decoding, by T-NeRV decoder 140, latent feature 118 to provide predicted frame 170 as an uncompressed video frame corresponding to input video frame 102. It is noted that the decoding of latent feature 118 to provided predicted frame 170 may be performed by T-NeRV decoder in the manner described in detail above by reference to FIGS. 1B and 2.

With respect to the method outlined by flowchart 380 and described above, it is noted that actions 381, 382, 383 and 384, or actions 381, 382, 383, 384 and 385 may be performed in an automated process from which human participation may be omitted.

Thus, the present application discloses systems and methods for performing tunable hybrid neural video representation that advance the state-of-the-art through at least the following contributions: (i) development of a T-NeRV encoder that combines frame-specific embeddings with GOP-specific features, thereby providing a lever for content-specific fine-tuning and (ii) extension of the information-theoretic INR compression framework to include embeddings, thereby advantageously making use of the significant redundancies within them. As noted above, when evaluated on the UVG dataset, the T-NeRV solution disclosed by the present application outperforms all previous video INRs on both video representation and video compression tasks.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a tunable neural network-based video encoder configured to:
   receive a video content including a plurality of video frames;
   generate a frame-specific embedding of a first video frame of the plurality of video frames;
   identify one or more group-of-pictures (GOP) features of a first plurality of the plurality of video frames, the first plurality of the plurality of video frames including the first video frame;
   determine a first weight and a second weight for applying to the frame-specific embedding and the one or more GOP features, respectively, as levers for content-specific fine-tuning;
   apply a first weight to the frame-specific embedding to obtain a weighted frame-specific embedding;
   apply a second weight to the one or more GOP features to obtain weighted one or more GOP features; and
   combine the weighted frame-specific embedding of the first video frame and the weighted one or more GOP features of the first plurality of the plurality of video frames to provide a latent feature corresponding to a compressed version of the first video frame.

2. The system of claim 1, wherein the one or more GOP features of the first plurality of the plurality of video frames are identified using a multi-resolution feature grid of the tunable neural network-based video encoder.

3. The system of claim 1, wherein tunable neural network-based video encoder is further configured to:
   extract, from the first plurality of the plurality of video frames, one or more temporal features of the first plurality of the plurality of video frames;
   wherein the frame-specific embedding is generated based on a combination with the one or more temporal features.

4. The system of claim 1, wherein the tunable neural network-based video encoder is trained using an optimized loss function including a distortion loss and an entropy loss.

5. The system of claim 4, wherein the distortion loss and the entropy loss are optimized jointly.

6. The system of claim 1, wherein the first video frame comprises a segment of the first plurality of the plurality of video frames, and wherein the frame-specific embedding comprises a plurality of frame-specific embeddings corresponding respectively to each of the segment of the first plurality of the plurality of video frames, and the latent feature is one of a plurality of latent features each corresponding respectively to a compressed version of each of the segment of the first plurality of the plurality of video frames.

7. A system comprising:

a neural network-based video decoder configured to:

receive a latent feature corresponding to a compressed version of a first video frame of a first plurality of a plurality of video frames included in a video content, the latent feature being a combination of a weighted frame-specific embedding of the first video frame with weighted one or more group-of-pictures (GOP) features of the first plurality of the plurality of video frames, wherein the weighted frame-specific embedding is a product of applying a first weight to a frame-specific embedding and the weighted one or more GOP features are products of applying a second weight to the one or more GOP features, wherein the first weight and the second weight are selected as levers for content-specific fine-tuning; and decode the latent feature to provide an uncompressed video frame corresponding to the first video frame.

8. The system of claim 7, wherein the frame-specific embedding is generated based on a combination with one or more temporal features extracted from the first plurality of the plurality of video frames.

9. The system of claim 7, wherein the first video frame comprises a segment of the first plurality of the plurality of video frames, and wherein the frame-specific embedding comprises a plurality of frame-specific embeddings corresponding respectively to each of the segment of the first plurality of the plurality of video frames, and the latent feature is one of a plurality of latent features each corresponding respectively to a compressed version of each of the segment of the first plurality of the plurality of video frames.

10. A method for execution by a tunable neural network-based video encoder, the method comprising:

receiving a video content including a plurality of video frames;

generating a frame-specific embedding of a first video frame of the plurality of video frames;

identifying one or more group-of-pictures (GOP) features of a first plurality of the plurality of video frames, the first plurality of the plurality of video frames including the first video frame;

determining a first weight and a second weight for applying to the frame-specific embedding and the one or more GOP features, respectively, as levers for content-specific fine-tuning;

applying a first weight to the frame-specific embedding to obtain a weighted frame-specific embedding;

applying a second weight to the one or more GOP features to obtain a weighted one or more GOP features; and combining the weighted frame-specific embedding of the first video frame and the weighted one or more GOP features of the first plurality of the plurality of video frames to provide a latent feature corresponding to a compressed version of the first video frame.

11. The method of claim 10, wherein the one or more GOP features of the first plurality of the plurality of video frames are identified using a multi-resolution feature grid of the tunable neural network-based video encoder.

12. The method of claim 10, further comprising:

extracting from the first plurality of the plurality of video frames one or more temporal features of the first plurality of the plurality of video frames;

wherein the frame-specific embedding is generated based on a combination with the one or more temporal features.

13. The method of claim 10, wherein the tunable neural network-based video encoder is trained using an optimized loss function including a distortion loss and an entropy loss.

14. The method of claim 13, wherein the distortion loss and the entropy loss are optimized jointly.

15. The method of claim 10, wherein the first video frame comprises a segment of the first plurality of the plurality of video frames, and wherein the frame-specific embedding comprises a plurality of frame-specific embeddings corresponding respectively to each of the segment of the first plurality of the plurality of video frames, and the latent feature is one of a plurality of latent features each corresponding respectively to a compressed version of each of the segment of the first plurality of the plurality of video frames.

* * * * *